TELEPHONE SYSTEM

Filed March 10, 1950

INVENTORS
EDMOND M. DELORAINE
JULIEN J. B. LAIR
BY
AGENT

Nov. 8, 1955 J. J. B. LAIR ET AL 2,723,309

TELEPHONE SYSTEM

Filed March 10, 1950 4 Sheets-Sheet 2

INVENTORS
EDMOND M. DELORAINE
JULIEN J. B. LAIR
BY
AGENT

Nov. 8, 1955 J. J. B. LAIR ET AL 2,723,309

TELEPHONE SYSTEM

Filed March 10, 1950 4 Sheets-Sheet 3

INVENTORS
EDMOND M. DELORAINE
JULIEN J. B. LAIR
BY [signature]
AGENT

TELEPHONE SYSTEM

Filed March 10, 1950 4 Sheets-Sheet 4

INVENTORS
EDMOND M. DELORAINE
JULIEN J. B. LAIR
BY R. J. Berry
AGENT

United States Patent Office 2,723,309

Patented Nov. 8, 1955

2,723,309

TELEPHONE SYSTEM

Julien J. B. Lair, Nutley, N. J., and Edmond M. Deloraine, New York, N. Y., assignors to International Standard Electric Corporation, New York, N. Y., a corporation of Delaware Application March 10, 1950, Serial No. 148,948

8 Claims. (Cl. 179—15)

This invention relates to intercommunication systems as used in the telephone, telegraph, etc. exchange systems of the kind in which the interconnection of two stations is determined by time displaced electrical pulses, all the intelligence being transmitted between stations over these pulses which may be modulated in any desired manner.

In one type of such systems as described in application Serial No. 766,583 filed August 6, 1947 (Van Mierlo 22X), now issued into Patent No. 2,520,185, a group of subscribers uses a common transmission medium and each subscriber is allocated a periodic short interval of time within a transmission sequence that comprises all the subscribers connected to such transmitting medium. The relative position occupied in the transmission sequence by a subscriber's time interval characterizes said subscriber. In such a system the subscriber's reference pulse is successively retarded between every two subscribers' sets either by the insertion of a delay line, by the retardation resulting from losses in the cable, or by a combination of both of these means. This arrangement makes it possible to add the successive delays in series, so that, generally speaking, it is not absolutely necessary to install delay lines in the subscriber sets for the "transmitting" channel, although it may be necessary to use a small auxiliary delay line in some subscriber sets owing to their particular location.

The above-described arrangement, however, has the drawback of making the position of a subscriber's time interval in the transmission sequence depend on his geographical location. Thus the subscriber located closest to the exchange has the economical advantage of having the smallest delay, while the subscriber located farthest away must, obviously, be given the greatest delay.

In accordance with one of the main features of the invention, a reference pulse distribution circuit is so laid out that the characteristic retardation of each subscriber line in the transmission sequence does not depend on the location of the subscriber along the distribution circuit. With this arrangement, the characteristic delay of each subscriber line is obtained by use of a delay line incorporated in the subscribers substation circuit. For example, if a sequence of 102 microseconds is selected for a 100-subsubscriber cable and 2 microseconds are reserved for the reference pulse, each of the 100 subscribers may be allocated 1 microsecond. Subscriber No. 4 will be allocated 1 microsecond in the 5th microsecond after the reference pulse, and subscriber No. $n$ will be allocated a time interval in the $n+1th$ microsecond after the reference pulse. The retardation lines incorporated in the subscriber sets will then have delays of from 1 to 100 microseconds, depending on the position assigned to the set involved in the transmission sequence.

According to another feature of the invention, the subscribers of the same group are divided into two or into a very small number $n$ of subgroups in such a way as to decrease by a factor of 2 or $n$ the size of the delay lines of the subscriber sets having the greatest delay. In this case, although there may be only a single cable to receive the modulated pulses, there will have to be as many cables for transmitting the pulses to be modulated as there are subscriber subgroups. Each of these cables will carry the same number of pulses per second, but the relative phase of these pulses will depend, on the one hand, on the delay of the subscriber set forming part of the subgroup served that has the lowest delay and, on the other hand, on the differences, if any, in the cable lengths.

According to still another feature of the invention, the exchange sends a positive and a negative pulse every 102 microseconds (in the example chosen) over the subscriber cables, the negative pulse being separated from the positive pulse by 50 microseconds. By means of tubes or detectors, for example, the positive pulses can be routed only to the subscriber sets whose delay is between 0 and 50 microseconds and the negative pulses, only to the subscriber sets having a delay of between 50 and 100 microseconds. For example, if the positive pulse is used as the reference pulse, a 50-microsecond delay will be saved in each of the sets that receive the negative pulse, the delay of which must be between 50 and 100 microseconds. Upon leaving the subscriber sets, the negative pulses may, if necessary, be converted into positive pulses either by reversing the output terminals or by means of a transformer.

According to another feature of the invention, the subgrouping of the subscribers and the transmitting of positive and negative pulses are combined in such a way as to decrease the size of the delay lines in the subscriber sets, thus making possible more economical operation.

According to still another feature of the invention, it is possible to reduce the size of the delay lines in the subscriber sets by sending during the 102-microsecond period, a series of $n$ pulses over the cable that feeds all the subscriber sets. The $n$ pulses can either be unevenly spaced or else they may be uniformly distributed every $100/n$ microseconds and are carried by $n$ substantially higher frequencies, which can be sent over the cables used (e. g., television cables). The subscriber sets are divided into $n$ groups and either each group or each subscriber is provided with a circuit tuned to one of the $n$ frequencies in such a way as to receive only the pulse that precedes the position that said group or set occupies in the transmission sequence. Thus, the delay of the pulse of frequency $f_1$ with respect to the reference pulse of frequency $f_0$ will make it possible to save in the lines a time interval equivalent to the delay introduced in the subscriber sets that receive pulse $f_1$.

The features referred to will be better understood from a reading of the following detailed description with reference to the accompanying drawings, in which Fig. 1 diagrammatically illustrates a cable with which a plurality of subscribers' stations are connected whose physical position does not determine the order in which the selection of a station may be effected.

Fig. 2 diagrammatically illustrates the manner in which a plurality of cables may be connected with an exchange;

Fig. 3 diagrammatically illustrates an arrangement for reducing the size of the delay networks provided at the substations by dividing the stations into subgroups.

Fig. 4 diagrammatically illustrates another arrangement for obtaining the same result as in Fig. 3, by employing positive and negative pulses;

Figure 1:
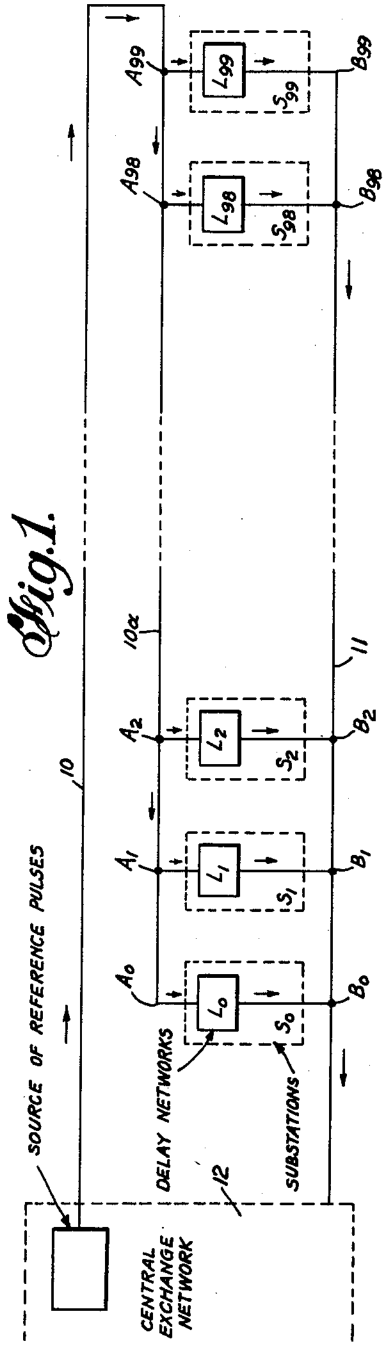

Referring now to Fig. 1, a cable having lines 10 and 11 extends from a central exchange 12. It is assumed that one hundred telephone substations $S_0$ to $S_{99}$ are bridged across the cable lines between points $A_0$, $A_1$, $A_2$–$A_{99}$ on line 10 and points $B_0$, $B_1$, $B_2$–$B_{99}$ on line 11. Pulses are sent from the exchange 12 over transmitting line 10 and travel in the direction of arrow in parallel over the different substations and back to the central exchange over receiving line 11. The line 10 is doubled back on itself forming a return loop and the connecting points $A_0$ to $A_{99}$ are on the doubled back portion 10*a* on the line. Thus the connecting point $A_0$ of station $S_0$ will be reached last by a pulse traveling over line 10 and the connecting point $A_{99}$ of station $S_{99}$ will be first. The cable line 11, on the other hand, is straight and the connecting point $B_0$ thereon is the nearest and connecting point $B_{99}$ farthest removed from the central exchange. Therefore the path traveled by a pulse over line 10, $A_{99}$, $S_{99}$, $B_{99}$, 11, will be of the same length as the path traveled by a pulse over line 10, 10*a*, $A_0$, $S_0$, $B_0$, 11, or over any of the other intervening stations, the parallel connections $A_0$, $B_0$, $A_1$, $B_1$–$A_{99}$, $B_{99}$, being all of the same length. It will be understood that in practice each line 10 or 11 will comprise a coaxial line or shielded pair.

An impulse sent out over line 10 may thus travel over one hundred different stations and return as a signal pulse over line 11 to the central exchange 12.

However, according to the present invention there is provided at each station a delay network $L_0$, $L_1$, $L_2$–$L_{99}$ which delays by 0, 1, 2–99 units of delay the passage of pulses through the corresponding station, whereby the impulse traveling over stations $S_0$ will arrive first over line 11 at station 12, the pulse traveling over station $S_1$ second, the pulse traveling over station $S_2$ third, etc., and the pulse traveling over station $S_{99}$ one hundredth or last, being delayed by ninety-nine units of delay with respect to the pulse that traversed station $S_0$.

Obviously the stations may be arranged in any order without affecting the relative positions of the pulses traveling therethrough. Even if stations $S_{99}$ and $S_2$ changed places, the pulse traveling over $S_{99}$ would arrive at the exchange 99 units of delay later than the pulse over $S_0$ and 97 units later than the pulse over $S_2$, because the delays are caused solely by the networks $L_0$ to $L_{99}$. This permits easy changing of subscribers' stations and their installation in any order without changing the time position of the pulses traveling through their stations.

It is to be understood that each of the stations $S_0$ to $S_{99}$ is provided with means for modulating the pulse passing through it, such modulation being in any desired manner, to transmit intelligence from that station to the main exchange.

Figure 2:
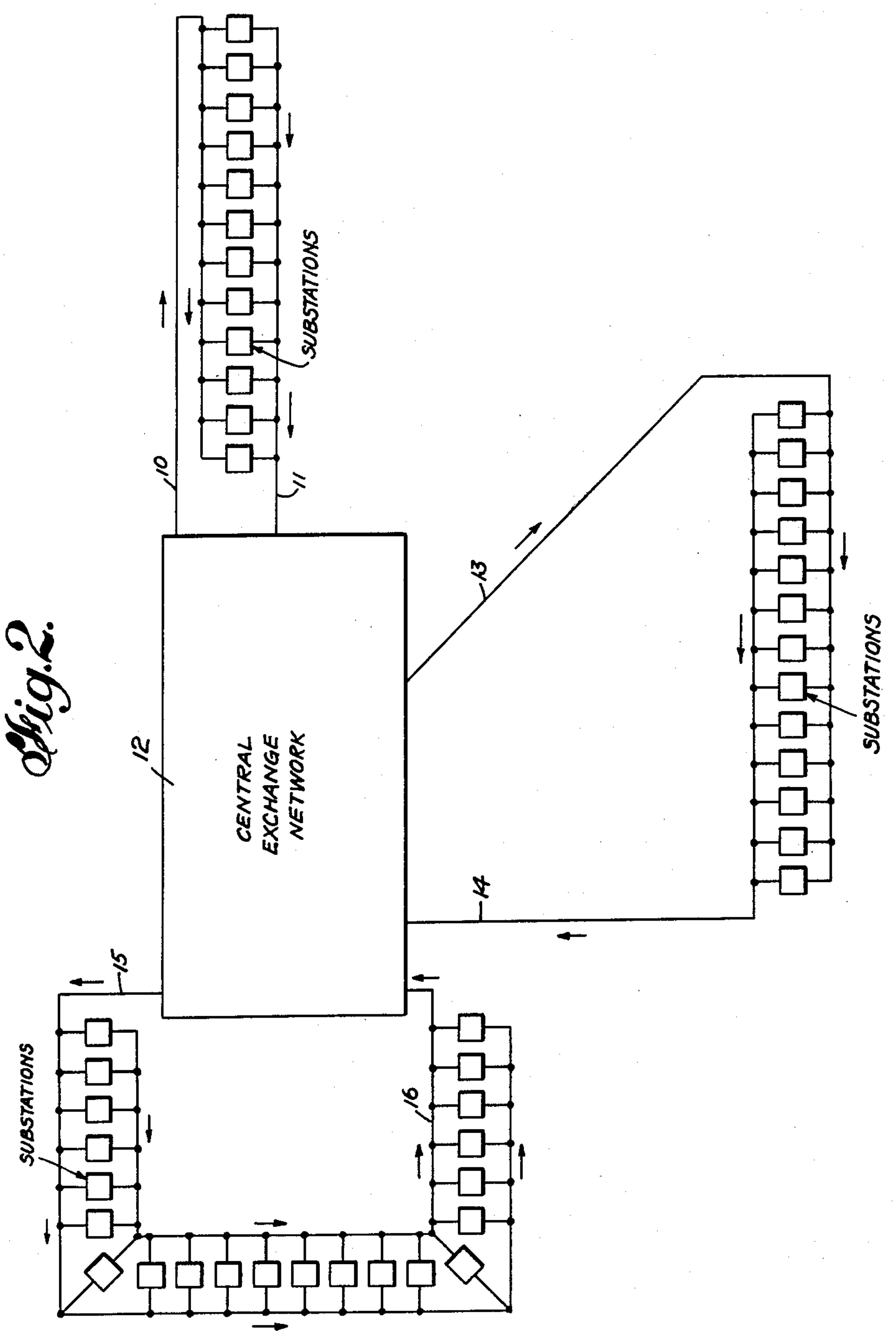

In the exchange system shown in Fig. 2, the exchange 12 is shown as having associated therewith the cable 10, 11 arranged in the manner described in connection with Fig. 1, and two other cables, one having lines 13, 14 and the other having lines 15, 16. Each of these cables has a plurality of stations bridged across its lines to produce the same result as explained in connection with Fig. 1.

Figure 3:
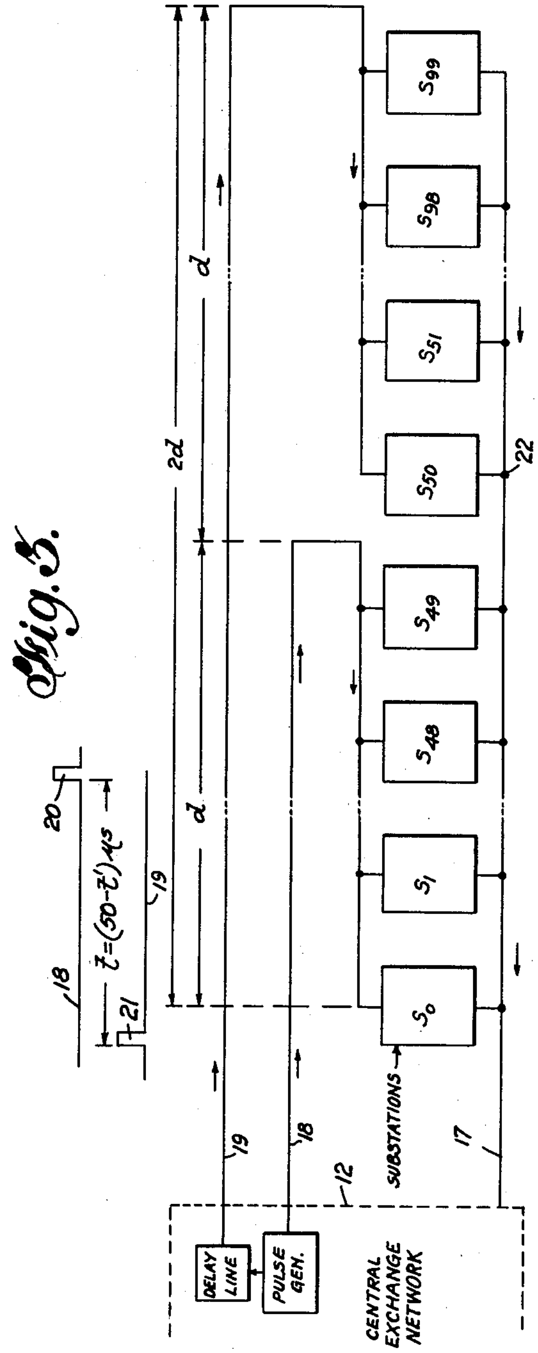

In the system shown in Fig. 3, 50 delay units may be eliminated in each transmission line for subscribers 50 to 99. The subscribers are connected with the exchange 12 over a cable having three lines; one line 17 common to all the subscribers and a line 18 individual to subscribers 0 to 49. The third line is 19 and stations 50 to 99 are bridged across it and the line 17. Each of the lines 18 and 19 has its end doubled back for the purpose explained in connection with Fig. 1.

Reference pulses 20 are applied to cable line 18, and pulses 21, which are auxiliary reference pulses, are applied to cable line 19. The delay of pulse 21 with respect to 20 would be fifty microseconds if the two cable lines were of the same length, but int he present case this delay will be shortened by the additional time required for a signal to traverse cable line 19 as compared to cable line 18. Assuming that *d* is the distance between the doubled back ends of cable lines 18 and 19, the additional distance travelled by a pulse over cable line 19 is 2*d*, and if the speed of propagation is V, then the additional time will be:

$$t'=\frac{2d}{V}$$

If the auxiliary reference pulse 21 is retarded by a delay line by $t=(50-t')$ microseconds, this pulse would arrive at point 22 with a delay of 50 microseconds, assuming no delay line is provided and that the unit of delay is 1 microsecond. Thus all the stations of group 50–99 will have a delay of fifty microseconds and one of these stations may, for instance, be classified as station 63 of the whole hundred by according to it a delay of $63-50=13$ units instead of 63 units as would be the case for the arrangement shown in Fig. 1. The station S50 will, therefore, have 0 delay just as station S0, the station S51 will have one unit of delay just as S1, etc., station S99 will have 49 units of delay just as station S49. There will be a saving of $50\times50=2500$ delay units to take care of 100 stations bridged across the same cable.

Obviously there could be other sub-divisions of the stations associated with the same cable as the one shown in Fig. 3, for the purpose of reducing the maximum delay required at the stations. In practice to determine the number of groups or subgroups a compromise will be effected between the saving in time delay units and the cost of providing additional cable lines.

Figure 4:
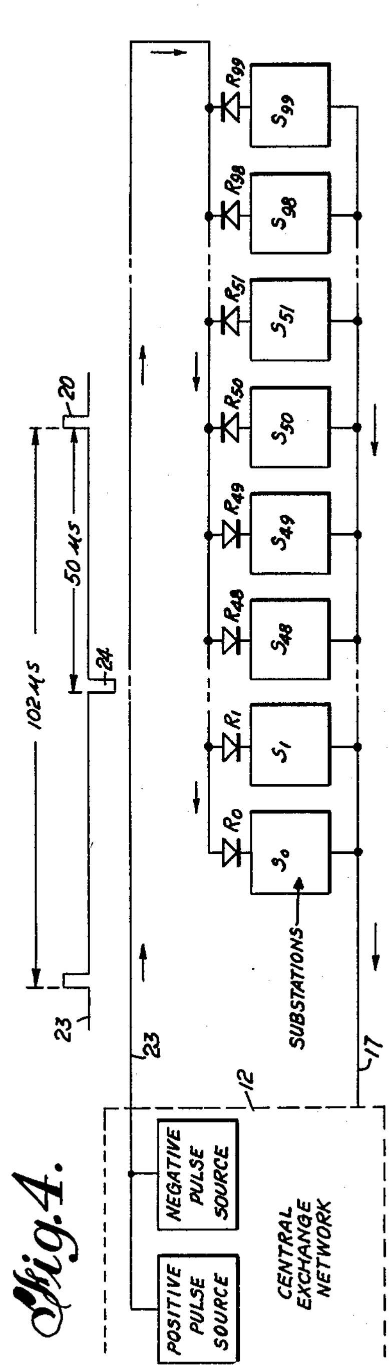

The results of Fig. 3 can be obtained also by the arrangement shown in Fig. 4 in which the cable line 17 is connected with all the 100 stations, as in Fig. 3, but the other terminals of each station are connected with the doubled back end of the same line 23. Stations 0 to 49 are connected with the line 23 over rectifiers R0, R1, etc.,–R48, R49, so poled as to permit the passage of positive pulses from line 23 to conductor 17, and stations S50 to S99 are connected over oppositely poled rectifiers R50, R51, etc.–R98, R99. The reference pulse 20 for stations S0 to S49 will be sent as a positive pulse whilst the auxiliary reference pulse 24 will be a negative pulse and spaced 50 microseconds from the reference pulse 20. The positive reference pulses 20 will pass to the stations S0 to S49 only, and the negative reference pulses only to the stations S50 to S99. All the stations of this second group S50 to S99 will thus have a permanent delay of 50 microseconds and their position among the hundred stations can be determined by imparting only a supplementary delay thereto, e. g. 13 units to station 63 instead of 63 delay units as in the case of Fig. 1. Obviously the stations need not be arranged in the same order in which they are shown in Fig. 4. Station S99 with its negatively poled rectifier R99 may be adjacent to station S0 with its positively poled rectifier.

Figure 5:
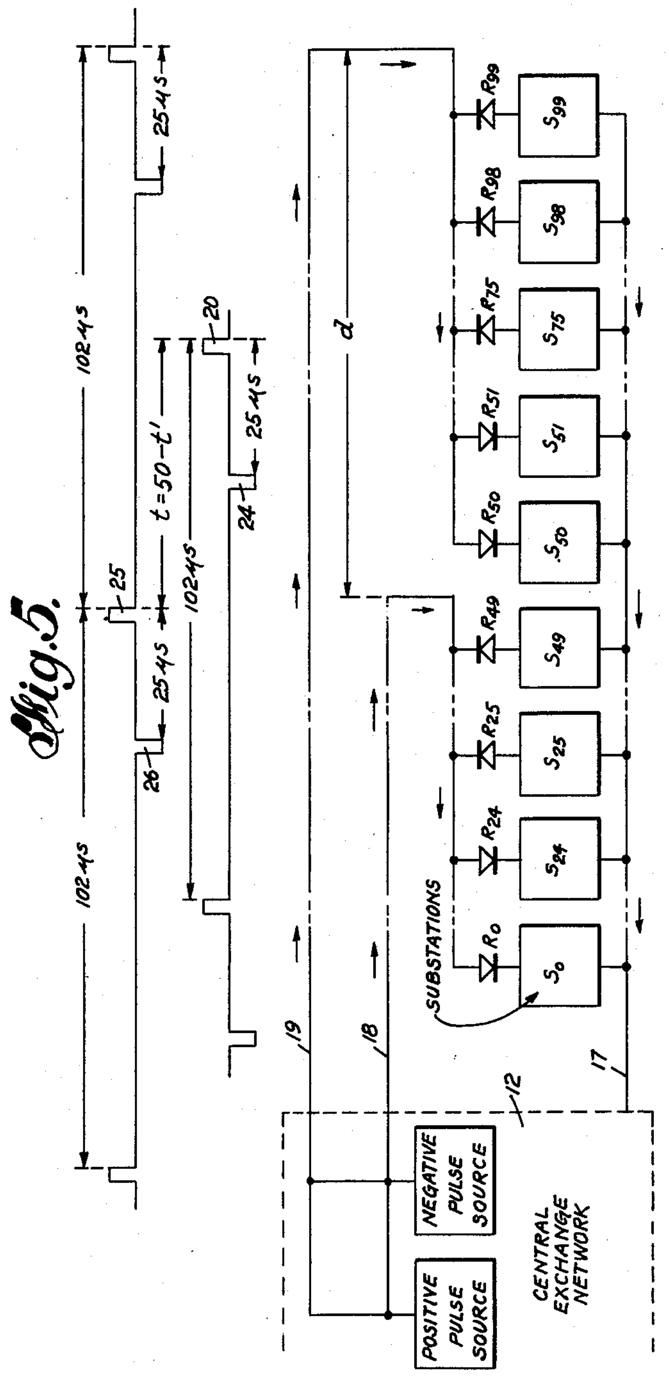
Fig. 5 illustrates an arrangement for making use of the principles of both Figs. 3 and 4.

Fig. 5 shows a combination of the arrangements illustrated in Figs. 3 and 4, the same reference numerals being applied as in the two previous figures, so as to simplify the reading of the circuit. The only difference is that in this arrangement the maximum delay is 25 microseconds. The cable line 18 will receive the positive reference pulse 20 followed by negative auxiliary reference pulse 24 with a delay of 25 microseconds. The subscribers S0 to S24 will receive via rectifiers R0 to R24 only the positive pulses, and the subscribers S25 to S49 which are branched across the doubled back end of line 18 will receive only the auxiliary negative pulses 24 with a delay of 25 microseconds via rectifiers R25 to R49. Station S0 will therefore have the same delay as station S25, station S1 the same as station S26, etc.

In the second group which are bridged across line 17 and the doubled back end of line 19, the positive reference pulses 25 will arrive with a delay of $50-t'$ microseconds followed by a negative auxiliary pulse 26 with an additional delay of 25 microseconds.

All the pulses will reach the second group with a 50 microsecond delay as compared to those reaching the first group, thus effecting a saving of 50 delay units, and within the group a saving of 25 delay units will be effected by the opposite poling of the rectifiers R50 to R74 as compared to R75 to R99. The total saving of delay units for 100 stations will be $50\times50+2(25\times25)=3750$ delay units of the 4955 units of delay which are necessary in the case in the arrangement shown in Fig. 1.

It will be noted that when a group is divided into a greater number of subgroups the saving in delay units is at a decreasing rate which explains the compromise above referred to.

The pulses may retain their positive or negative polarity in the output circuits of the stations, or they may be converted into pulses of the same polarity, e. g. by means of transformers.

Figure 6:
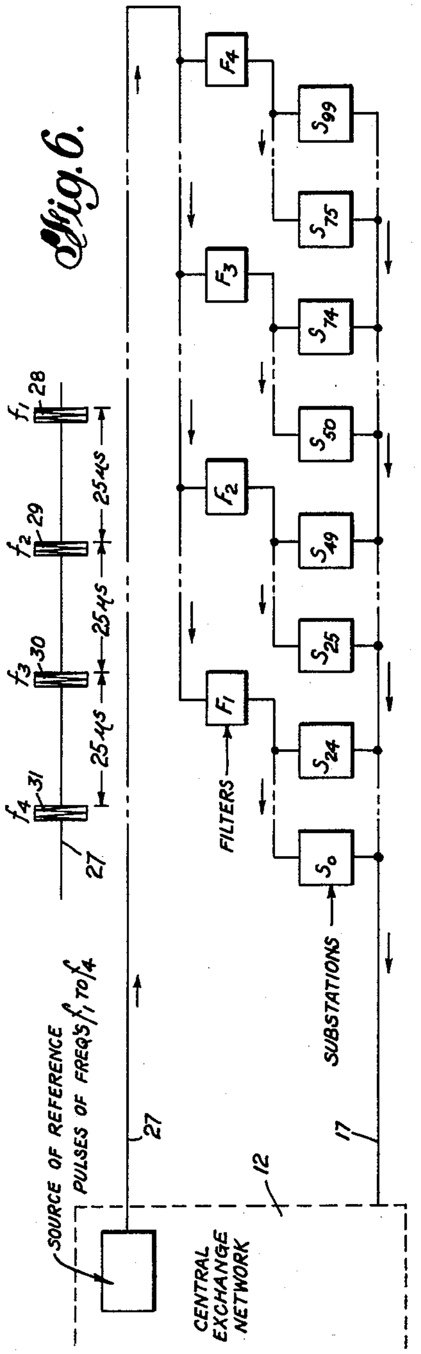
Fig. 6 illustrates another arrangement for reducing the size of the delay networks by employing carrier frequencies for the pulses.
Figure 7:
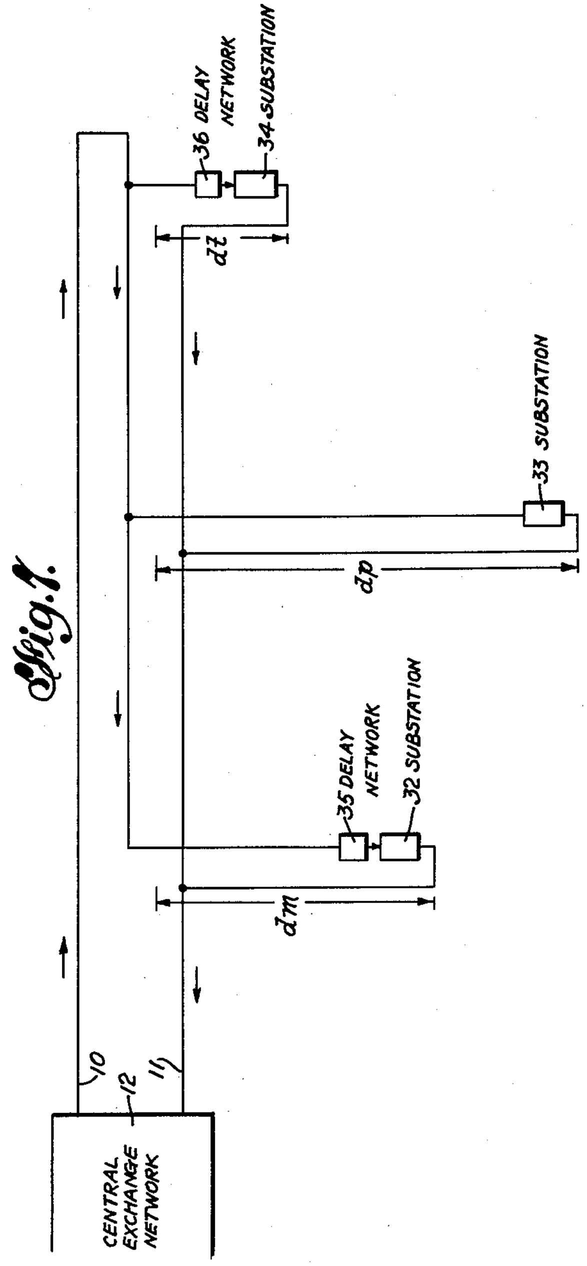
Fig. 7 diagrammatically illustrates an arrangement in which an adjustable delay network is used at the subscriber's station.

In the arrangement shown in Fig. 6, the same result is obtained as in Fig. 5, by dividing the stations S0 to S99 into four equal subgroups and bridging them across cable lines 17 and 27, each over a selective wave filter F1, F2, F3, F4. The line 27 will carry the reference pulses. These are sent at intervals of 25 microseconds, the first pulse 28 at frequency $f1$, the second pulse 29 at frequency $f2$, the third 30 at frequency $f3$, and the fourth 31 at frequency $f4$. The filter F1 will pass only pulses 28, filter F2 only pulses 29, filter F3 only pulses 30, and filter F4 only pulses 31. Since, as above stated, these pulses have a fixed delay of 25 microseconds, the same saving can be effected by the arrangement of Fig. 6 as by the arrangement of Fig. 5. In Fig. 7 we have again indicated the exchange 12 and the lines 10, 11 of Fig. 1 leading thereto. Three stations 32, 33 and 34 are shown looped from line 11 to the doubled back end of conductor 10. Each loop is of a different length, the loop of station 32 being length $dm$, of station 33 being $dp$, and of station 34 being $dt$. Station 33 is the farthest removed from the cable and station 34 the nearest. The distance $dp$ between station 33 and the cable adds a delay of $$\frac{2dp}{V}$$

V being the speed of propagation of pulses along the loops. In order to avoid the necessity of changing the delay network which is provided within a station and is characteristic of its sequential position, a loop may itself be provided with a delay network such as 35, 36 to balance the difference between $dp$ and $dm$, or $dp$ and $dt$, and thus re-establish the same electrical distance between each station and the cable.

We claim:

1. An intercommunication system of the kind described comprising an exchange network, a pulse transmitting line and a pulse receiving line extending from said exchange, and a plurality of substation sets connected in parallel across said lines, each of said substation sets being arranged to receive a reference pulse and to receive a signal pulse at a predetermined time after said reference pulse, which time is different from the corresponding time of any other substation, the sum of the length of the transmitting line between the exchange network and the point of connection of a substation set to said transmitting line and the length of the receiving line between the exchange network and the point of connection of the substation set to said receiving line being the same for all substation sets.

2. An intercommunication system, according to claim 1, in which the substation sets are connected to the transmitting line in a predetermined sequential arrangement and to the receiving line in a reverse sequential arrangement.

3. An intercommunication system according to claim 1, in which the said lines diverge from said exchange network and have overlapping portions at their extremities forming a return loop, and in which the substation sets are connected across said overlapping portions.

4. In an intercommunication system of the kind described, an exchange network, a pulse receiving line and first and second pulse transmitting lines extending therefrom and forming two return loops, the pulse receiving line being common to said loops, said pulse transmitting lines being of different lengths with said second line longer than said first line, two subgroups of substation sets connected in parallel across said receiving line and said respective first and second transmitting lines, each group of substation sets being connected to said receiving line in a predetermined sequential arrangement and to a respective one of said transmitting lines in a reverse sequential arrangement, means for transmitting reference pulses from said exchange over said first transmitting line and means for transmitting auxiliary reference pulses over said second transmitting line with a delay shortened by the additional time required for a pulse to traverse the second line as compared to the first line, each of said substation sets being arranged to receive a reference pulse and to receive a signal pulse at a predetermined time after said reference pulse, which time is different from the corresponding time of any other substation.

5. In an intercommunication system of the kind described, an exchange network, a pulse receiving line and a pulse transmitting line extending therefrom and forming together a return loop, two sub-groups of substation sets connected in parallel across said receiving and transmitting lines, said substation sets being connected to said receiving line in a predetermined sequential arrangement and to the transmitting line in a reverse sequential arrangement, each of said substations in a group having means for delaying a pulse passing therethrough a predetermined time which is different from the delays produced by the other substations of the group, oppositely poled rectifiers inserted respectively in the parallel connections from the two subgroups of substation sets to said transmitting line, and means for transmitting alternate positive and negative reference pulses from said exchange network over said transmitting line, said positive and negative pulses having a time displacement equal to half the time sequence occupied by both subgroups of substation sets, each of said substation sets being arranged to receive a reference pulse and to receive a signal pulse at a predetermined time after said reference pulse, which time is different from the corresponding time of any other substation.

6. In an intercommunication system of the kind described, an exchange network, a pulse receiving line and first and second pulse transmitting lines extending therefrom and forming a single return loop, said pulse transmitting lines being of different lengths with said second line longer than said first line, a first subgroup of substation sets connected in parallel across said receiving line and said first transmitting line, a second subgroup of substation sets connected in parallel across said receiving line and said second transmitting line, said groups of substation sets being connected to said receiving line in predetermined sequential arrangements and to the respective transmitting lines in reverse sequential arrangements, each of said substations in the group having means for delaying a pulse passing therethrough a predetermined time which is different from the delays produced by the substations of the group, rectifiers poled in one direction inserted in the parallel connections of one half of the substation sets of both subgroups, rectifiers poled in the opposite direction inserted in the parallel connections of the other half of the substation sets of both subgroups, and means for transmitting positive and negative reference pulses over said first and second transmitting lines having a time displacement equal to one quarter of the time sequence occupied by both subgroups of substation sets, each of said substation sets being arranged to receive a reference pulse and to receive a signal pulse at a predetermined time after said reference pulse, which time is different from the corresponding time of any other substation.

7. In an intercommunication system of the kind described, an exchange network, a pulse receiving line and a pulse transmitting line extending therefrom and forming a single return loop, a plurality of sub-groups of substation sets connected in parallel across said receiving line and said transmitting line, said substation sets being connected to said receiving line in a predetermined sequential arrangement and to said transmitting line in a reverse sequential arrangement, each of said substations in a group having means for delaying a pulse passing therethrough a predetermined time which is different from the delays produced by the other substations of the group, a filter tuned to a characteristic carrier frequency connected in the common parallel connection for each sub-group of substation sets, and means for cylically transmitting from said exchange network reference pulses sequentially modulated at different carrier frequencies corresponding to the pass frequencies of said filters and having a time displacement equal to the time sequence occupied by all the sub-groups of substation sets divided by the number of sub-groups, each of said substation sets being arranged to receive a reference pulse and to receive a signal pulse at a predetermined time after said reference pulse, which time is different from the corresponding time of any other substation.

8. An intercommunication system according to claim 7 in which the transmitting and receiving lines form a single return loop and said substation sets are connected in loops connected in parallel between said receiving line and said transmitting line, adjustable delay lines being inserted in some of said loops to compensate for the differences in the lengths of the respective loops.

References Cited in the file of this patent

Standard Handbook for Electrical Engineers, section 14, paragraph 21—Knowlton—7th edition.